(12) United States Patent
Bea et al.

(10) Patent No.: US 8,946,586 B2
(45) Date of Patent: Feb. 3, 2015

(54) DEVICE AND METHOD FOR LASER PROCESSING

(75) Inventors: Martin Bea, Stuttgart (DE); Joachim Schulz, Gerlingen (DE); Hartmut Zefferer, Mühlacker (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 472 days.

(21) Appl. No.: 12/730,999

(22) Filed: Mar. 24, 2010

(65) Prior Publication Data

US 2010/0206857 A1      Aug. 19, 2010

Related U.S. Application Data

(63) Continuation of application No. PCT/EP2008/008076, filed on Sep. 24, 2008.

(30) Foreign Application Priority Data

Sep. 24, 2007 (DE) .......................... 10 2007 045 500.5
Sep. 26, 2007 (DE) .......................... 10 2007 046 074.2

(51) Int. Cl.
*B23K 26/00* (2014.01)
*B23K 26/06* (2014.01)
*B23K 26/073* (2006.01)

(52) U.S. Cl.
CPC .................................. *B23K 26/0734* (2013.01)
USPC .................................. 219/121.64; 219/121.73

(58) Field of Classification Search
USPC .......................................... 219/121.6–121.86
See application file for complete search history.

(56) References Cited

U.S. PATENT DOCUMENTS

| 3,972,599 A | 8/1976 | Engel et al. |
| 4,691,093 A * | 9/1987 | Banas et al. ............. 219/121.63 |

(Continued)

FOREIGN PATENT DOCUMENTS

| EP | 0384582 | 8/1990 |
| GB | 2337720 | 1/1999 |
| JP | 7251284 | 10/1995 |

OTHER PUBLICATIONS

ISO: "Lasers and laser-related equipment—Test Methods for laser beam widths, divergence angles and beam propagation ratios—Part 1: Stigmatic and simple astigmatic beams", International Standard, ISO, No. 11146-4, Jan. 15, 2005, 24 pages.

(Continued)

*Primary Examiner* — Sang Y Paik
(74) *Attorney, Agent, or Firm* — Fish & Richardson P.C.

(57) ABSTRACT

A device for laser processing, in which the device includes: a laser including a resonator, the resonator being configured to generate a laser beam with a predetermined caustic during operation of the device; and an optical element to transform a laser beam generated by the resonator into a transformed laser beam having an annular intensity distribution in a plane perpendicular to a propagation direction of the transformed laser beam during operation of the device, in which the annular intensity distribution extends along the propagation direction of the transformed laser beam, and has, at a minimum diameter of a caustic of the transformed laser beam, a beam radius and a ring width corresponding to 50% of a maximum beam intensity in a radial direction of the transformed laser beam, and a ratio of the ring width to the beam radius is less than 0.6.

22 Claims, 6 Drawing Sheets

(56) References Cited

U.S. PATENT DOCUMENTS

| | | | |
|---|---|---|---|
| 4,937,424 A * | 6/1990 | Yasui et al. | 219/121.6 |
| 5,848,091 A * | 12/1998 | Mombo Caristan | 372/103 |
| 6,605,796 B2 * | 8/2003 | Brandinger et al. | 219/121.67 |
| 6,605,799 B2 * | 8/2003 | Brandinger et al. | 219/121.74 |
| 6,963,046 B2 * | 11/2005 | Herrmann | 219/121.63 |
| 2005/0275814 A1 * | 12/2005 | Eib et al. | 355/18 |

OTHER PUBLICATIONS

International Search Report from corresponding PCT Application No. PCT/EP2008/008076, mailed Feb. 24, 2009, 3 pages.

Beijersbergen et al., "Helical wavefront laser beams produced with a spiral phase plate", Cleo/Europe '94, pp. 381, 1994.

* cited by examiner

DEVICE AND METHOD FOR LASER PROCESSING

CROSS REFERENCE TO RELATED APPLICATIONS

This application is a continuation of and claims priority under 35 U.S.C. §120 to PCT/EP2008/008076, filed on Sep. 24, 2008, and designating the U.S., which claims priority under 35 U.S.C. §119 to German Patent Application Nos. 102007045500.5, filed on Sep. 24, 2007 and 102007046074.2, filed Sep. 26, 2007. The contents of the prior applications are hereby incorporated by reference in their entirety.

TECHNICAL FIELD

The present disclosure relates to a device and a method for laser processing, in particular for laser welding.

BACKGROUND

When processing workpieces with a laser beam, it is mainly Gaussian laser beams that are used. This processing includes welding, cutting, melting, heating, erosion, marking, thermal joining. In the case of laser welding, in particular $CO_2$ laser welding, a connection between workpieces to be welded is created via an energy input, defined by the laser beam, into the structure to be welded, by melting the two workpieces in the area irradiated by the laser beam, after which they re-solidify jointly after they have coalesced.

A keyhole (cannula) filled with metal vapor, through which the laser beam can penetrate deep into the workpiece and around which the melt is produced, is produced by the focused laser beam during deep-penetration laser welding. This narrow keyhole can produce instabilities in the melt which lead to eruptions and thus to a suboptimal weld seam.

Likewise, when welding thin sheets by heat conduction welding, in the case of sheets coated with other metals, the produced melt is not stable and, as a result of eruption, a reliable weld seam is prevented. Work has been done, in the case of welding, for example, zinc-plated sheets for the automotive industry, in which spacers are used to ensure that evaporations which occur do not blow the melt out of the weld seam. For example, small microbeads are introduced between the sheets to be welded prior to the welding in order to create this distance.

SUMMARY

The radiation of $CO_2$ lasers is approximately 90% reflected when it strikes a metal surface perpendicularly. When the radiation strikes at virtually a grazing angle (angle of incidence >80°), coupling levels of about 40% each time the laser beam strikes the metal surface can be achieved.

This specification describes technologies relating to devices and methods for laser processing of materials, in particular with a $CO_2$ laser. In general, one aspect of the subject matter described in this specification can be embodied in a device for laser processing that includes a laser having a resonator that is equipped to generate a laser beam with a predetermined caustic, an optical element for transforming the laser beam into a beam having an annular intensity distribution along an area of the caustic of the laser beam, in which the annular intensity distribution in the area of the smallest diameter of the caustic along the propagation direction of the beam in a plane that is perpendicular to the propagation direction of the beam has a beam radius that is determined according to the 2nd moment method and a ring width determined at an intensity of 50% of the maximum intensity in the radial direction, and wherein the quotient of the ring width and of the beam radius is less than 0.6. In some implementations, the quotient of the ring width is less than 0.5 or less than 0.4.

The processing of a workpiece by means of a laser beam can include any combination of welding, cutting, melting, heating, eroding, marking, and thermal joining the workpiece.

The details of one or more embodiments are set forth in the accompanying drawings and the description below. Other features and advantages will be apparent from the description, drawings and from the claims.

DETAILED DESCRIPTION

A device for laser processing (such as, for example, laser welding) or a laser welding unit can include a laser, a computer-numerical-controlled (CNC) multiaxial movement unit, an optical system for guiding a laser beam within the movement system, a processing and focusing lens system, and a workpiece holding device. The movement unit can move either the laser beam over the workpiece or the workpiece under the laser beam. Versions in which both the workpiece and the laser beam are moved are also possible. In some cases, scanning systems for moving a bundled laser beam over the workpiece can also be used. Scanning systems can include a combination of rotating faceted mirrors and/or tiltable deflection mirrors which reflect the laser beam to different points by adjusting the mirror angles. An advantage of using such systems is that it can enable high speed positioning of the laser beam.

The laser can include, for example, a single-mode fiber laser, such as Nd:YAG laser (having a wavelength approximately equal to 1.06 μm), a $CO_2$ laser, such as a $CO_2$ slab laser (having a wavelength approximately equal to 10.6 μm), or a disk laser. In some implementations, such as laser welding of materials, a laser having a high beam quality and high laser power can be used. Diode lasers also can be used. For example, a semiconductor laser operating in a range of a few 100 watts or more can be used. In certain cases, the diode lasers have higher conversion efficiency compared to either Nd:YAG or $CO_2$ lasers.

In some cases, the laser beam, such as the beam of the Nd:YAG laser and the beam of the diode laser, can travel along a fiber, i.e., the beam is guided by an optical waveguide or fiber optic cable into the laser welding lens system which can include a set of lenses. On the other hand, the beam, such as the beam of the $CO_2$ laser, is guided through the air and directed to the weld site by mirrors where the beam is focused using either lenses or focusing mirrors.

The laser can include a resonator, by which the laser beam is generated. The beam properties of a laser beam can be determined by the type of laser resonator, i.e., the resonator can make laser emission possible in a single direction, which can be a function of the mirror arrangement and the geometry of the active medium. Given that lasers may emit radiation running virtually parallel in one direction, it is possible to achieve a higher power density than with conventional light sources by bundling (e.g., focusing) the beams of the lasers.

Accordingly, the laser can generate a laser beam with predetermined beam properties, in particular an appropriate divergence, a predetermined intensity distribution and a predetermined caustic. Caustic denotes the geometry of the propagating laser beam in space and in particular the energy distribution or intensity distribution of the laser beam in a plane that is perpendicular to the propagation direction. The focus caustic denotes the structure along the propagation direction in the area of the focus when focusing the laser beam.

Along the propagation direction of the laser beam, the diameter of the laser beam changes according to the divergence of the laser beam. The minimum diameter of the laser beam is called the beam waist. When focusing the laser beam, the minimum diameter may be achieved at the focus. However, the focus does not always coincide with the beam waist.

The behavior of laser beams can often be satisfactorily described by Gaussian beams, i.e., the intensity of the laser beam reaches a maximum in the center and weakens according to a Gaussian distribution in a radial direction that is perpendicular to the propagation direction of the laser beam. This mode is called TEM_00 mode. Other transverse modes which show another profile can also be stimulated; depending on the number of their nodal lines in horizontal and vertical direction, they are called TEM_xy mode. For these modes, the light path through the resonator as far as the point of origin is in part different. In other words, the resonator length appears to have been changed. This can lead to a distortion of the longitudinal mode spectra by the spectra of different transversal modes overlapping each other.

The laser beam emitted by the resonator normally has a Gaussian intensity distribution and is transformed by an optical element into a beam with an annular intensity distribution. The optical element can be an element through which the mode of the laser beam is modified. In particular, the number of modes can be changed and a laser beam with an annular intensity distribution that is perpendicular to the propagation direction can be generated. For example, the optical element can be an optical element having a vortex structure.

In some implementations the laser beam is transformed by the optical element into a laser beam having an annular intensity distribution in a plane that is perpendicular to the propagation direction. For example, the transformed laser beam can have an annular intensity distribution with a circular minimum or a zero intensity at the center of the plane that is perpendicular to the propagation direction. The intensity distribution can be circular around the center and have an internal diameter di and an external diameter da. Within an inner circle defined by diameter di, the intensity is very low or equal to zero. On the other hand, the annular intensity distribution can have a maximum intensity within a ring defined between the internal diameter di and the external diameter da.

Accordingly, a beam with an annular intensity distribution can be described by two parameters: the beam diameter, or beam radius which is half the beam diameter, and a ring width. The beam diameter or the beam radius is preferably determined via the 2nd moment method, which is based on the second moment of the intensity distribution. This method is described in EN ISO 11146-1:2005. The 2nd moment width corresponds to a beam diameter that is 4 times σ, where σ is the standard deviation of the horizontal or vertical marginal distribution of a beam. It is also possible to define the beam radius such that it is the distance from the center of the annular intensity distribution to the point at which the integrated surface below the intensity curve has reached a predetermined value, such as, for example 86% of the total intensity. The distance to the maximum of the annular intensity distribution from the center can also be defined as the beam radius. An annular intensity distribution may have a circular power density distribution of maximum intensity having an ellipticity greater than 0.8 and preferably greater than 0.87.

The ring width can be defined by the intensity distribution in the plane that is perpendicular to the propagation direction. The ring width is the difference between an inner radius and an outer radius. The inner radius may correspond to the radius of the ring, defined from the center of the intensity distribution, at which the intensity of the annular intensity distribution reaches a predetermined fraction of the maximum intensity, such as, for example, 10% or 50% of the maximum intensity. Similarly, the outer radius may correspond to the radius of the ring, defined from the center of the intensity distribution, at which the intensity has fallen, after passing through the maximum intensity, to the same predetermined fraction of maximum intensity as defined for the inner radius, such as, for example, 10% or 50% of the maximum intensity. Accordingly, a 10% ring width or a 50% ring width can be defined. A 50% ring width corresponds to a ring width in which the inner radius and outer radius are determined in a radial direction at an intensity of 50% of the maximum intensity. A 10% ring width corresponds to a ring width in which the inner radius and outer radius are determined in radial direction at an intensity of 10% of the maximum intensity.

The area of the smallest diameter of the caustic along the propagation direction of the beam is normally the beam waist. When using a focusing lens system, the area of the smallest diameter of the caustic is the focus area and thus the focus caustic.

The quotient (Q) (e.g., ratio) of the ring width (RB) and the beam radius (SR) is a numerical value without a unit which, in some cases, is smaller than 0.6 at a 50% ring width. In some implementations, the quotient is preferably smaller than 0.5. In certain cases, the quotient is preferably smaller than 0.4. At a 10% ring width, the quotient is, in some implementations, preferably smaller than 1. In other implementations, the quotient is preferably smaller than 0.9. In certain cases, the quotient is preferably smaller than 0.8.

The caustic of the laser beam and the focus is provided along an area of the laser beam, so that the annular distribution remains largely preserved in at least an area of the propagation direction of the transformed laser beam. The values of the quotient of ring width and the beam radius can vary, but remain substantially constant. The transformed laser beam thus has a defined ring structure or an annular intensity distribution over an area of the propagation direction in a plane that is perpendicular to the propagation direction.

The annular structure can also be an ellipse, or a quasi-annular structure with a minimum of intensity in the central area and an increased intensity distribution surrounding this. A distribution with one or more minima can also be obtained, such as an intensity distribution having shape similar to a horizontal eight in the x-y plane, i.e., the plane that is perpendicular to the propagation direction. Such a shape can be achieved, for example, by positioning two circles next to each other. In particular, the laser beam is transformed into a ring focus with Laguerre ring modes.

A ring structure can be produced by singularities of the phase. These singularities are also called optical vortices. These are points of the scalar light field at which the phase of the light is not defined and the intensity disappears.

Unlike conventional laser processing devices, using the present laser device can introduce high intensity power into a rim area of the annular focus of the workpiece. This generates a caustic defined in the focus of the laser beam with an annular intensity distribution, so that material of the workpiece is not heated directly in the center. Accordingly, in some examples, such as laser welding, metal vapor in the keyhole is not heated excessively. As a result, smaller instabilities of the keyhole and weld seam occur, which can improve the quality of the weld seam. As a result of the high concentration of the laser power in the defined ring area of the laser beam, unlike in the case of welding with a Gaussian intensity distribution, the threshold intensities can be exceeded and material processing can take place.

In some embodiments, a device for laser processing is provided in which the quotient (Q) of radial ring width (RB) and beam radius (SR) continues to be preserved over a length of at least n times the Rayleigh length zR in front of and behind the area of the smallest diameter of the caustic along the propagation direction of the beam (100') deviating by less than 10%, in which n is equal to 5. In some implementations, n is equal to 10. In other implementations, n is equal to 50. Other values for n can be defined as well.

In this way, an length over which the quotient is substantially preserved is created in the propagation direction of the laser beam in front of and behind the area of the smallest diameter of the caustic along the propagation direction of the beam. This means that the annular intensity distribution of the beam is preserved in a depth of field area in front of and behind the area of the smallest diameter of the caustic. A deviation of the quotient in the defined area is less than 30% (e.g., less than 25%, less than 20%, less than 15%, less than 10%, less than 5%, or less than 1%).

This length in front of and behind the area of the smallest diameter of the caustic along the propagation direction of the beam can be equal to at least n times the Rayleigh length zR. For example, n can be equal to 5, equal to 10, or equal to 50. Other values of n can be used as well. In some cases, length is, for example at least 10 mm, at least 20 mm, or at least 100 mm.

In some embodiments, a device for laser processing is provided in which an area of the smallest diameter of the caustic along the propagation direction corresponds to the focus produced by a focusing lens system. In this way, a laser beam is provided with a caustic in the focus which has the ring structure defined using the quotient over a predefined depth of field area. A workpiece can therefore be processed without problems that might occur when the intensity maximum is located in the center of a laser beam at its focus.

In some embodiments, a device for laser processing is provided in which the optical element (30) has a quotient-adjustment device for adjusting the quotient (Q) of radial ring width (RB) and beam radius (SR). The quotient can be predetermined or in the case of the laser processing device adjusted or changed using the quotient-adjustment device. It is thus possible to generate a laser beam with a predetermined annular intensity distribution and to make more targeted selections for different application cases. In this way, annular distributions with a small ring width can be provided with larger beam diameters for application cases which require such specifications. Alternatively, for other applications, the quotient can be adjusted. Adjustment can also take place during the operation of the laser processing device.

The quotient (Q) of radial ring width (RB) and beam radius can be adjusted for example by the repeated application of the transformation of the laser beam with the optical element. When transmissive lens systems are used, the individual lens systems can be added together using, for example, a phoropter array by swiveling additional lens systems. With some lens systems, it is also possible to eliminate or weaken the effect by using opposite lens systems. For example, when a vortex geometry on the optical element is used, the quotient is determined by the vortex pitch, while the diameter is determined by the vortex pitch and focal length of the focusing lens system and the illumination of the lens. By providing different vortex geometries with a different pitch, these can be added together. If optical elements with a negative vortex pitch are then provided, the optical elements can again be used to (partially) reverse the effect.

In some embodiments, a device for laser processing is provided in which the optical element (30) is arranged outside the resonator (11). In this way, it is possible, without having to engage in the resonator, to realize the structure using optical elements outside the resonator. Accordingly, ring modes do not need to be produced in the resonator. In some cases, a structure which is provided on the coupling-out mirror of the resonator corresponds to a structure outside of the resonator.

In some embodiments, a device for laser processing is provided in which the value of the beam radius (SR) can be adjusted at the level of the beam waist or focus. The beam radius or the beam diameter can be adjusted using the quotient-adjustment device, in particular by changing the mode and, therefore, the caustic of the beam. In some cases, the beam radius is adjusted using the focusing lens system.

In some embodiments, a device for laser processing is provided in which the optical element (30) is a reflective lens system and the reflective lens system also has a geometry for correcting imaging errors. A reflective lens system can include a mirror. A reflective lens system, i.e., a mirror or a reflecting surface, can be used which is suitable for reflecting the corresponding laser beam, such as, for example, a $CO_2$ laser beam. The reflective lens system can contain a structure which changes the caustic of the laser beam and thus indicates a predetermined geometric distribution of the intensity along the propagation direction, i.e., transforms the laser beam into a new shape with a new intensity distribution. This occurs by changing the mode of the laser beam.

The reflective lens system can have a geometry for correcting imaging errors, such as, for example, correcting imaging errors produced due to the deflection of the laser beam by the reflective optical element, e.g., the mirror, during the transformation. The aberrations which result from tilted use of the reflective lens system, in particular of vortex mirrors, can be corrected in order to achieve round ring foci with mirror lens systems. This correction can be integrated by fast-tool diamond turning directly in the mirror. Multi-spot foci can be similarly corrected with regard to symmetry. If a phase change is caused, not by transmissive lenses, but by reflective lens systems, a correction can be performed where there is significant tilting, in order to not produce aberrations.

For a multi-spot element (general double reversing mirror with n facets) the correction can be calculated as follows: depending on the desired orientation, phi, of the spots in the beam coordinates system (in which phi=0 points in the direction of the X-axis) the small roof edge angle, delta, of a facet is chosen at 90° deflection in the z-y plane to be delta=e/2*sqrt(1+(cos(phi))$^2$) wherein e is the desired small divergence angle of the radiation to the beam axis and the orientation of the surfaces below the angle projected onto the deflection mirror coordinates system psi=arctan(tan(phi)*sqrt(2)), in which psi=0 coincides with phi=0. The correction can be determined analogously for other 2-theta deflection angles.

A vortex mirror has the advantage that the effect leads to an azimuthally linearly rising phase spiral even where there is tilted first-order deflection. The level of the tilting simultaneously effects a change in the size of the linear phase pitch. In addition, asymmetries in the focus have been observed in experiments, the cause of which probably lies in higher-order aberrations. The image field correction takes place by adapting the azimuthal pitch to a non-linear pitch. At 90° deflection, the contour is thus not f(z)=h*psi/(2*Pi) with h=jump height, which matches the 2-theta deflection angle (h=N*lambda/(2*cos(theta)), with N being a whole number and lambda being the wave length used), but F(z)=h/(2*Pi)*arctan(tan(psi)/sqrt(2)). This similarly corresponds to an elliptical adaptation of the round contour to the tilted deflection plane. All of the above corrections can also be transferred to reflection angles other than 90°.

Preferably, it is also possible, instead of providing the vortex mirror with a single step, to divide the vortex structure, the phase pitch of which is defined by the parameter N, into N segments which each contain smaller steps of the height h/N. It is also possible to provide a different whole number of steps with the result that the total height of all of the steps corresponds to the total height h of the single step. This can be advantageous from a manufacturing point of view. Preferably, the step will occur at a point which is given by the connection condition of a steady phase relationship of the beam to be generated: at the angle positions phi, or in the projection psi onto the mirror surface, which corresponds exactly to a whole number multiple of 2*Pi in the case of the resulting phase relationship, a jump in the height j*2*Pi can take place (with j being equal to a whole number), without the phase relationship or the beam being disrupted. Thus, possible jump sites are psi_i for the steps at psi_i=arctan(tan (i*2*Pi/N+phi$_0$)/cos(theta)) with i=0, 1, 2 . . . N−1 and any offset phi$_0$.

In this way, a laser beam with a largely annular focus caustic can be provided. The laser beam can preferably be propagated with a high beam quality up to close to the lens and then transformed using the optical element into an annular laser beam with a focus diameter, adjustable within a large range and with an annular intensity distribution.

By propagating divergent beams, rim areas of the optical elements may be hit and, as a result, there may be losses. The focus diameter also may change in this case. The lens system for transforming the laser beam into a laser beam with an annular intensity distribution can be therefore be arranged close to the focusing lens system. A beam of good quality (for example, with telescope correction) can thus propagate to the cutting head and the transformation can take place there first, by for example increasing the n in the TEM0$_n$* using a vortex geometry. The diameter then is also increased and the beam quality is reduced. In the case of fiber lasers, it is possible to integrate this structure at the fiber end or in the secondary focusing lens system, for example, as a (polished) plate or lens in the focusing lens system.

In some implementations, the reflective lens system includes a metal mirror, such as, for example, a Cu mirror. It is possible to use the metal mirror to deflect or transform laser beams such as, for example, $CO_2$ laser beams. In some implementations, the optical element has a vortex structure. The vortex structure can be integrated in the focusing lens system.

A vortex structure or lens produces a helical phase progression along the propagation direction and thus also in the focus. A zero field therefore exists in the center of the focus, and thus produces a ring mode. The vortex lens can provide ring diameters less than 1 mm. The beam, which is generated with a vortex mirror, behaves essentially like a Gauss-Laguerre mode TEM0$_n$*. The TEM0$_n$* mode is denoted TEM0$_n$ similar to the Gaussian-Laguerre mode, which is overlaid with an identical but rotated TEM0$_n$ mode in such a way that a ring with a zero point forms in the center. These modes also propagate in form-invariant outside a focus caustic, such that the annular intensity distribution is preserved over a large area along the propagation direction. In fact, as n increases, the beam quality decreases, and the radial distribution, i.e., the quotient Q of (radial) ring width compared with the ring diameter, is reduced, providing a "sharper" ring.

The laser beam can therefore be transformed into a beam with a vortex caustic by a mirror having a vortex structure. The laser beam can be transformed into a ring structure by using a vortex mirror outside of the resonator. It is therefore possible to propagate a relatively compact beam with little divergence up to close to the lens, to reflect it there using a vortex mirror and to transform it into a laser beam with a ring structure. A large focus diameter can then be produced in spite of a large lens illumination.

In some embodiments, the beam diameter can be adjusted, for example, to 0.6 mm to 1.5 mm. Other beam diameters are possible as well. The mode orders TEM0$_n$, or in the case of the vortex structure TEM0$_n$*, are adjusted by selecting the mode order n. In some implementations, n is greater than 1 (e.g., greater than 2 or greater than 3). When generated via a vortex geometry, the number of modes can be produced using an n-lambda phase pitch of the vortex geometry. For the different mode orders n, different beam diameters can then be realized. For example, for n=4, beam diameters of approximately 0.6 mm to 0.9 mm can be realized; for n=6, beam diameters of approximately 0.8 mm to 1.2 mm can be realized; and for n=8, beam diameters of approximately 1 mm to 1.5 mm can be realized.

Because of the adjustability of the ring focus, it is possible to control melting processes in an even more targeted manner during a welding process. For example, melting baths can be produced in which the fused melt has a smaller dynamic and thus a spurting-out of the melt can be avoided. Different diameters can also be chosen for various laser welding applications. In addition, the intensity of the laser beam in the focus can be altered, independently of the chosen diameter. Thus in different welding applications, applying a desired energy to a workpiece over a predetermined surface can be described by the diameter of the ring structure.

In some cases, it is possible, for example, to weld structures with gaps using a focus of approximately 0.6 mm to 1.5 mm. Such structures may have a gap of more than 3% of the sheet thickness and have sheet thicknesses of more than 5 mm. Using a focus as described herein, the workpieces can be melted in a square butt joint without the laser beam propagating through the gap or only one workpiece melting in the rim area because of slight misalignment.

In some aspects, the subject matter contained in the present disclosure includes a method for processing a workpiece using a laser beam that includes: generating a laser beam with an annular intensity distribution along an area of the caustic of the laser beam, in which the annular intensity distribution in the area of the smallest diameter of the caustic along the propagation direction of the beam in a plane that is perpendicular to the propagation direction of the beam has a beam radius that is determined according to the 2nd moment method and a ring width determined at an intensity of 50% of the maximum intensity in the radial direction, in which the quotient of the ring width and the beam radius is smaller than 0.6. For example, the quotient can be smaller than 0.5 or smaller than 0.4.

In this way, a laser beam with an annular intensity distribution can be generated as described above using the choice of the quotient and a workpiece can be processed with this transformed laser beam. The laser beam can be focused onto a processing area—in this case, the quotient of ring width and beam radius in this focus area can be preserved. The workpiece then can be processed with the laser beam with an annular intensity distribution.

The quotient then can be adjusted based on the choice of a mode order for a ring mode $TEM0_n$ with n>1 (e.g., n greater than 2, n greater than or equal to 3, or n greater than or equal to 5). In some cases, the quotient can be adjusted by using a vortex geometry outside of the resonator with an n-lambda phase pitch of the vortex geometry. The mode order n can thus be adjusted outside of the resonator.

In some implementations the laser is used to weld two workpieces together. The two workpieces can be arranged overlapping or abutting. It is possible to produce butt joints, lap joints or fillet welds using the laser. In some embodiments, a lap welding of zinc-plated car body sheet or aluminum can be carried out with a mode order n between 3 to 8. In some cases, the lap welding is carried out with a mode order n of 6. The stack effect produced by this allows the zinc vapor or aluminum vapor forming in the gap to leak without melt ejections. In some cases, a first workpiece and/or a second workpiece, which has a material with a high evaporation rate, is processed with a laser beam having a quotient of less than 0.6 (e.g., less than 0.5, less than 0.4, less than 0.39, less than 0.37, or less than 0.35). In some cases, this corresponds to an adjusted mode order between 3 to 8.

A material with a high evaporation rate is a material that can evaporate when heated and would thus leave the melt. Examples of such materials include, but are not limited to, non-ferrous metals, i.e., metals having different alloy components, such as, for example, zinc-plated sheets, aluminum coated sheets, aluminum sheets, sheets of aluminum alloys or generally coated sheets or materials with a surface coated with these constituents.

In this way, a method for increasing process efficiency, process stability and weld seam quality during the $CO_2$ laser welding of materials with high evaporation rates (in particular non-ferrous metals such as aluminum alloys or zinc-plated sheets) can be provided by optimizing the spatial focus structure. In some cases, the laser beam has an annular intensity distribution along the whole focus caustic.

For weld processing of materials with high evaporation rates, process efficiency, process stability and weld seam quality can be improved by using a $CO_2$ laser beam transformed to be annular, in which the ring diameter and the peak intensity in the ring can be adjusted independently of each other. A process-adapted widening of the seam capillary is possible using the symmetrical, and in some cases, direction-independent, enlargement of the cross-section of the seam capillary below the focal point. In some cases, this can be achieved with a ring diameter that is adjusted independently of the focal length of the focusing lens system, while maintaining high intensities. In some cases, this can be achieved by using focusing lens systems having short focal lengths. As a result, the coupling efficiency, process stability and also seam quality can be improved.

In some embodiments, tailored blanks are square butt welded with a mode order n between 3 to 4. As a result, the coupling efficiency is increased and the gap bridgeability can be improved. In some implementations, wide weld seams are also produced in the case of large weld depths of more than 2 mm with a mode order n between 4 to 6. Very wide seams of more than 1 mm also can be produced in the large weld depths of more than 2 mm, without a significant increase in the weld depth. In some cases, a first workpiece and a second workpiece are welded together in a deep-penetration welding process, in which a laser beam has a quotient of less than 0.6 (e.g., less than 0.5, less than 0.4, less than 0.37, or less than 0.36). In some cases, this can be achieved by coherent phase modulation, in which the originally homogeneous intensity distribution of the laser beam is transformed into an annular distribution that propagates in an annular manner through the focus caustic.

In some implementations, the local energy transmission in the keyhole is controlled in a targeted manner by the selectable, annular enlargement of the focus diameter: large ring diameters with simultaneously high peak intensities in the ring lead to the absorption of a high proportion of the laser beam energy in the metal melt, even with small penetration depths of the laser beam. The depth-to-width ratio of the weld seam can therefore be controlled and predetermined in a targeted manner. In this way, deep-penetration welding can be performed such that a predetermined ratio of the weld seam is preserved.

In some implementations, screening effects, due to the metal vapor flowing out of the keyhole (which are typical in particular when welding with $CO_2$ lasers) are minimized by the annular beam and a reduction in the ionization threshold can be brought about. The cross-section of the vapor channel (which is symmetrically enlarged over the whole of the focus caustic) reduces the rate of outflow of the metal vapor similar to the diameter of the seam channel. Closures of the vapor channel with subsequent pore inclusions or melt product ejections can occur less frequently due to the resultant reduction in the turbulent flows in the melting bath.

In some cases, the effect of an annularly focused beam displays no directionality in the plane (X/Y direction) and is characterized in particular by a symmetrical weld behavior when defocusing in the direction of beam spread, as the ring structure is preserved over a predetermined area along the propagation direction. Accordingly, when the laser processing nozzle travels over workpieces that display changes in the beam propagation direction, a reliable weld seam can be produced during deep-penetration welding without requiring the laser processing head to be moved in the propagation direction, given that the ring structure is preserved over an area of the propagation direction.

Given the coherent phase modulation, the combination of a short focal length (high peak intensity in the ring) with a sufficiently large ring diameter (da, di) makes it possible to simultaneously achieve large diameters of the vapor capillary on the one hand and a high process efficiency on the other hand. because, independently of the ring diameter of the focused beam, the wall surface of the vapor channel and thus the melt itself is irradiated with the highest possible intensities.

With the help of a coherent phase modulation, which can be performed at any position in the beam path between the coupling-out mirror and the focusing element in the beam path, the original, typically homogeneous intensity distribution (rotation-symmetrical TEM, Gaussian distribution) of a $CO_2$ laser beam can be transformed into an annular intensity distribution with an adjustable ratio between the original beam diameter and the ring diameter that is measurable after the transformation. This annular intensity distribution can also be preserved, during or after an imaging. The focus caustic of a beam transformed to be annular by coherent phase modulation thus can have an annular distribution not only in front of the focal point, but also in the focal point itself or behind the focal point. Ring diameter and peak intensity in the focused beam follow the laws known for rotationally-symmetric TEM.

In some cases, the ring diameter and peak intensity prevailing in the ring of a $CO_2$ laser beam transformed in an annular manner are adjusted independently of each other. This can be achieved by an exchange of optical elements at the processing point. For weld processing tasks with strict requirements regarding precise predetermined seam geometry (such as deep-penetration welding), the present method can provide several advantages as discussed below. For example, targeted control of the weld seam geometry during deep-penetration welding with $CO_2$ laser radiation can be achieved using symmetrical, direction-independent enlargement of the cross-section of the vapor capillary, as well as below the focal point. In particular, the present method provides broader penetration and formation of the melting bath so that the weld seam can be achieved in a lower area. This takes place in particular by a process-adapted widening of the vapor capillary (when an adjustable ring diameter independent of the focal length of the focusing lens system is used). A targeted control of the local energy transfer from the laser beam into the melt is also possible.

High intensity values can be maintained with the present method, for example, by using focusing lens systems preferably with a short focal length. As a result, the coupling efficiency, the process stability and also the seam quality can be improved.

Through the ring structure or the cylindrical structure of the laser beam behind the focal point, it is possible to irradiate in a targeted or selective manner only the vapor capillary wall (e.g., melt). Scattering losses by outward-flowing metal vapor in the center of the laser beam, in which the intensity is equal to zero, also can be minimized by concentrating the laser power onto the rim area of the laser beam (e.g., ring). As the heating of the metal vapor flowing out of the melting bath through the vapor capillary is now also minimized, the ionization threshold can be increased. This improved protection against heating of the metal vapor to ionization temperature is already effected within the vapor capillary, where the metal vapor is not reached by the cooling effect of working/protective gases. As a result, the risk of closure of the vapor capillary by completely ionized metal vapor present in the vapor capillary or over the workpiece is minimized and the ionization threshold thereby likewise increased.

In some embodiments, during deep-penetration welding, turbulences in the melting bath can be reduced by the reduction in the rate of flow of the metal vapor in the vapor capillary. Given that the metal vapor has a lower speed or a lower kinetic energy when flowing out of the vapor channel, the protective gas effect can be improved.

Processing costs also can be reduced by increasing the ionization threshold. For example, less expensive argon with an average cooling effect or ionization energy can be used instead of expensive helium with a maximum cooling effect or ionization energy.

In addition, there is also a saving with respect to the focusing lens systems used. For example, due to a lower rate of contamination of the lens system, clamping devices, and component-positioning devices, the process stability is improved and less power is lost before the laser beam acts on the workpieces.

In some embodiments, square butt gap bridgings of thick steel sheets with sheet thicknesses of more than 5 mm and large gaps covering more than 3% of the sheet thickness are welded with a mode order n between 4 to 8, for example, n=6. The coupling efficiency is thereby increased and gap bridgeability improved.

Deep-penetration welding of components with gaps with $CO_2$ laser radiation can be used in shipbuilding, heavy machinery construction, container construction, with tailored blanks or housing manufacture. This process involves, in addition to a deep weld seam, the ability to bridge gaps which occur in such applications, in particular because these workpieces are arranged alongside or joined to each other and a gap still occurs. Such gaps can have dimensions of more than 3% of the sheet thicknesses.

In some cases, the local energy transmission in the keyhole is controlled in a targeted manner by the selectable, annular enlargement of the focus diameter: large ring diameters with simultaneously high peak intensities in the ring lead to the absorption of a high proportion of the laser beam energy in the metal melt, even with small penetration depths of the laser beam. Accordingly, the targeted melting of the component edges to produce a sufficiently large melting bath volume can be achieved.

The possibility, preferably given by the coherent phase modulation, of the combination of as short as possible a focal length (high peak intensity in the ring) with a sufficiently large ring diameter makes it possible with this method to simultaneously achieve large diameters of the vapor capillary on the one hand and a high process efficiency on the other hand because, independently of the ring diameter of the focused beam, primarily the wall surface of the vapor channel and thus the melt itself is irradiated with the highest possible intensities.

In addition to the advantages already listed in the case of deep-penetration welding, a still more targeted optimization of the gap bridging during the deep-penetration welding of components with gaps with $CO_2$ laser radiation can be achieved.

A sufficiently large melting bath volume can be produced by the targeted irradiation of the component surfaces at the edge of the joint gap. Using the presently disclosed method, a symmetrical, direction-independent enlargement of the cross-section of the focused laser beam can be achieved below the focal point. Through a process-adapted expansion of the laser beam by adapting the diameter of the ring structure, a targeted adaptation of the irradiated surface to the width of the joint gap is possible. In particular, an adjustable ring diameter can be provided independently of the focal length of the focusing lens system used.

In some embodiments, the quotient of radial ring width and beam radius are preserved over an area of at least n times the beam radius in front of and behind the area of the smallest diameter of the caustic along the propagation direction of the beam. In some cases, the quotient deviates by less than 10%, in which n can be equal to 2, 5 or 10. Other values of n can be used as well.

With this "depth of field" in the area of the smallest diameter of the caustic along the propagation direction of the beam, the described effects can be achieved in the previously mentioned welding applications. Processing a workpiece using a laser beam can include welding, cutting, melting, heating, eroding, marking, thermal joining or any combination thereof.

The advantages described here can be transferred to the different processing methods. Advantages in the design of the melting dynamic can be achieved during the cutting or welding and in the other applications by the pronounced intensity minimum in the center of the laser beam and the concentration in the rim area of the ring. In some cases, in the present method can use a protective gas such as, for example, argon, N2, CO2 or any combination thereof.

In some cases, the laser beam is guided using a reflective lens system, i.e., for example through a metal mirror or Cu mirror. A laser beam which has an annular intensity distribution along an area of the focus caustic of the laser beam, i.e., has a ring focus over an area of the propagation direction of the laser beam in the focus, can be produced outside of the resonator. In some cases, the originally homogeneous intensity distribution of a laser beam is transformed by coherent phase modulation into an annular one which also propagates in particular in an annular manner through the focus caustic. In certain implementations, a laser beam with Laguerre ring modes is produced. In some cases, the beam is transformed into a vortex structure over the propagation direction on the reflective lens system, with the result that the laser beam has a ring structure over a wide area of the focus along the propagation direction and the laser beam thus has a cylinder-like intensity distribution in the propagation direction around the propagation direction. This area can be made in almost any length through the use of a vortex mirror. In some cases, the diameter of the laser beam with a ring focus and the ring width can be adjusted.

The present method of laser processing also can be used to optimize the weld seam geometry and process efficiency when joining sheets of small thickness with $CO_2$ laser radiation. By optimizing the spatial focus structure as annular intensity distribution along the whole focus caustic, it is possible to weld the thin sheets without the laser beam piercing the sheets or leading to ejections and irregularities in the upper bead of the weld seam by dynamics in the melt.

The local energy transmission from the laser beam into the produced metal melt is controlled in a targeted manner through the selectable, annular enlargement of the focus diameter: large ring diameters with simultaneously high peak intensities in the ring lead to the absorption of a high proportion of the laser beam energy in the metal melt, even with small penetration depths of the laser beam, whereby the depth-to-width ratio of the weld seam can be controlled in a targeted manner. Wide weld seams which do not lead to breakouts through the sheets are thereby realizable even with thin sheets.

The possibility, given by the coherent phase modulation, of combining as short as possible a focal length (high peak intensity in the ring) with a sufficiently large ring diameter makes it possible with this method to simultaneously achieve a metal melt which is up to several millimeters wide on the one hand and a high process efficiency on the other hand because, independently of the ring diameter of the focused beam, an annular vapor channel in which the largest part of the laser radiation is absorbed by multiple reflection is produced by the irradiation of the workpiece with the high intensities. The method makes it possible in particular to also produce weld seam geometries with improved process efficiency, in contrast to thermal conduction welding which is used with strongly defocused radiation.

To join sheets of small thickness with $CO_2$ laser radiation, a $CO_2$ laser beam transformed to be annular can be used. The ring diameter and peak intensity prevailing in the ring can be adjusted independently of each other and through a simple exchange of optical elements at the processing point. In this way, it is possible to control the weld seam geometry in a targeted manner when joining sheets of small thickness with $CO_2$ laser radiation, as the symmetrical, direction-independent enlargement of the cross-section of the vapor capillary can act in particular also below the focal point. A process-adapted, and thus geometry-adapted, widening of the melt can thus be achieved in particular through the adjustable ring diameter independently of the focal length of the focusing lens system used, while maintaining the high intensity values, in particular by using focusing lens systems with a short focal length. As a result, optimum coupling efficiency, process stability and also seam quality can be achieved.

The energy can be introduced in a wide area into the workpieces by the targeted, selective irradiation of only the annular vapor capillary. A targeted control of the local energy transfer from the laser beam into the melt is thus possible. Through-radiation losses in the center of the melt or laser beam are minimized by targeted concentration of the laser power onto the rim area of the laser beam, i.e., onto the ring geometry. Because the melting bath in the center of the beam is minimally heated, the ionization threshold can be increased. In this way, the melt is prevented from passing through or dripping by the low temperature and high viscosity of the melt in the center of the beam.

As a minimal penetration depth of the laser beam is necessary to achieve a continuous seam, turbulences in the melting bath are reduced. This is supported by the large width of the melt and the concomitant minimal thermal conduction loss into the basic material.

Figure 1A:
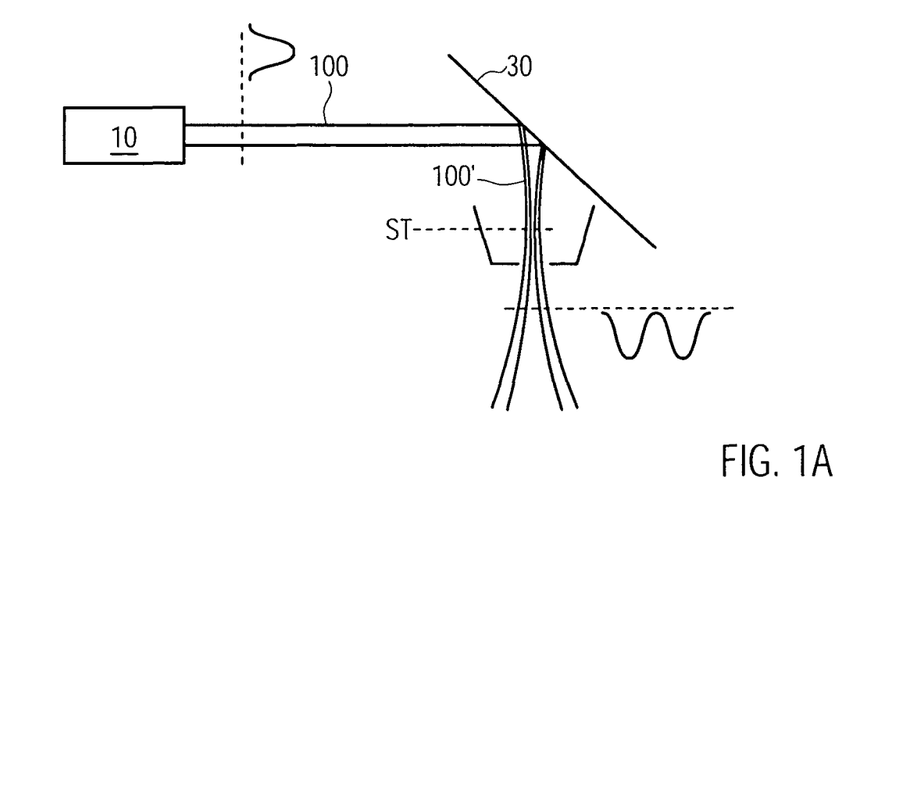
FIG. 1A illustrates a schematic view of an example device for laser welding.

A schematic view of an example device for laser processing is illustrated in FIG. 1A. A laser 10 emits a laser beam 100 with a Gaussian profile. The laser beam 100 is guided and transformed by a vortex mirror 30 into a laser beam 100'. This transformed laser beam 100' has an intensity distribution according to a vortex structure, i.e., the modified laser beam 100' has an annular intensity distribution in a plane that is perpendicular to the propagation direction of the modified laser beam 100' and which extends along the propagation direction. The modified laser beam 100' has, at dashed line ST, a minimum beam diameter, i.e., the so-called beam waist. In this area, the ratios between the ring width and the beam diameter or the beam radius apply. The arrangement according to FIG. 1A does not include a focusing lens system.

Figure 1B:
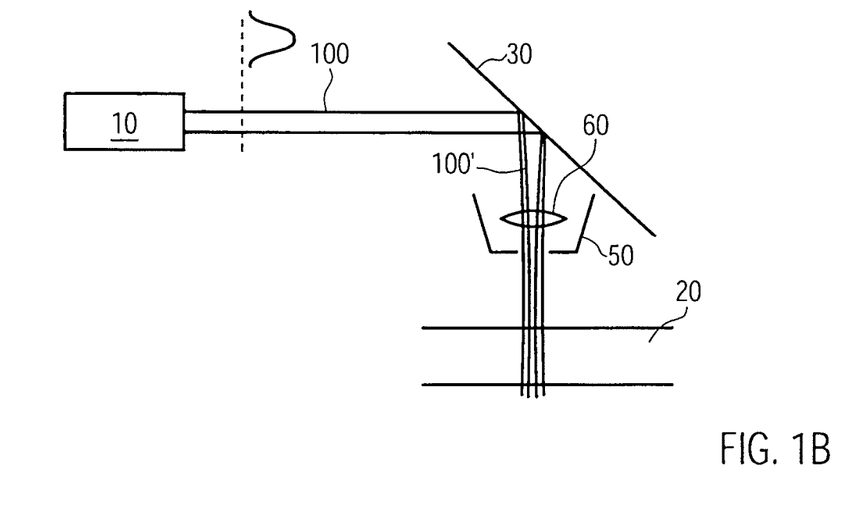
FIG. 1B illustrates a schematic view of an example device for laser welding.

The schematic view from FIG. 1A is supplemented by a focusing lens system 60 in FIG. 1B. As shown in FIG. 1B, the modified laser beam 100' is guided via the focusing lens system 60 onto a workpiece 20. The focused modified laser beam 100' is directed or focused onto the workpiece 20 through a laser processing nozzle 50. At the focal point of the modified laser beam 100', inside the workpiece 20, the modified laser beam 100' has an annular intensity distribution. This annular intensity distribution thus exists in front of the focal point and also behind it. In the focus area, the ratio between ring radius and beam radius can be established. A protective gas or working gas, which supports the laser processing, can also be applied through the laser processing nozzle 50 in the direction of the workpiece 20.

In operation, a laser beam 100 emitted from laser 10 can be kept constant in terms of its energy or else the beam energy can be varied depending on the application. The path or the diameter of the ring focus of the modified laser beam 100' can be chosen in advance through the selection of one or more vortex mirrors 30. It is thus possible to vary the diameter of the ring focus in the focal point of the modified laser beam 100' and also its intensity between different processing applications or in the course of an applied processing process.

Figure 2A:
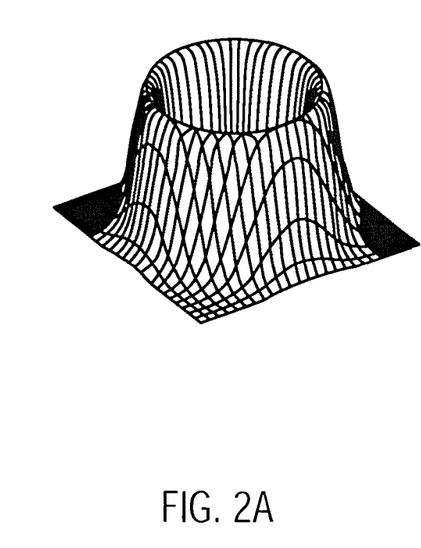
FIG. 2A is a three-dimensional representation of an example transformed laser beam.

FIG. 2A shows a three-dimensional graph of an example transformed laser beam having an annular intensity distribution with ring focus at a focal point of a plane that is perpendicular to the propagation direction of the laser beam. The intensity distribution shows a circular maximum intensity which decreases towards a center where it has a zero point. The intensity distribution also decreased from the maximum away from the center.

Figure 2B:
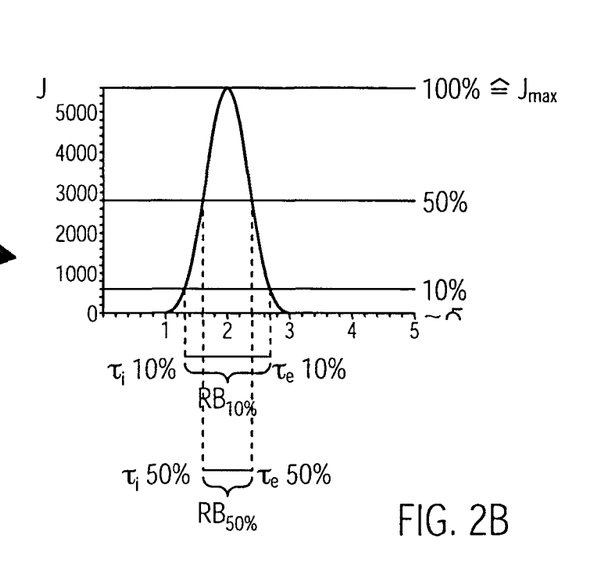
FIG. 2B shows a graph of intensity versus distance for an example transformed laser beam having an annular intensity distribution.

FIG. 2B shows a graph of intensity versus distance for an example transformed laser beam having an annular intensity distribution. In particular, FIG. 2B represents a cross-section corresponding to a portion of the intensity distribution of the example modified laser beam of FIG. 2A. The center of the annular intensity distribution is located on the zero point of the X-axis. A unit of length, which is directly proportional to the distance from the center in radial direction, is plotted on the X-axis. The intensity at the corresponding radial point is plotted on the Y-axis. As shown in FIG. 2B, a Gaussian intensity distribution is established around a maximum value occurring at a value of 2 on the X-axis results. Although the intensity distribution in the negative direction of the X-axis is not shown, a corresponding maximum intensity would occur at the X-value equal to −2. The intensity distribution shown is understood to be rotationally symmetric about the Y-axis.

Parallel to the X-axis, three intensity levels are shown and designated 10%, 50% and 100%=$J_{max}$. These are the levels at which the intensity has reached the corresponding fraction of the maximum intensity. The intersections of these 10% and 50% levels correspond to the X-values ri and ra, which are respectively used as internal and external radius to determine the ring width RB. The internal and external radius values at 10% produce the 10% ring width, RB 10%, and the internal and external radius values at 50% produce the 50% ring width, RB 50%. That is to say, a 50% ring width, RB 50%, equals the difference between the external radius at 50% less the internal radius at 50%, i.e., RB 50%=ra(50%)−ri (50%). For the example shown in FIG. 2B, a value of approx. 0.8 units of length corresponds to a 50% ring width.

The beam radius is determined according to the 2nd moment method and is not shown here. In a simplified manner, in this symmetrical case, the intensity maximum can be used as beam radius, with the result that a beam radius of approximately 2 units of length. In the present example, a ratio of the 50% ring width to the beam radius is approximately 0.8/2=0.4.

With a vortex mirror, the ratio of ring width to beam radius can be determined by the vortex pitch, while the beam diameter is determined by the vortex pitch and focal length of the focusing lens system and illumination of the lens. With the vortex mirror, the diameter and width of the ring focus in the focus area may change only slightly. As the pitch of a vortex mirror increases, the ratio of ring width to beam radius decreases. In this way, it is possible to adjust in advance the ratio of ring width to beam radius.

Figure 3:
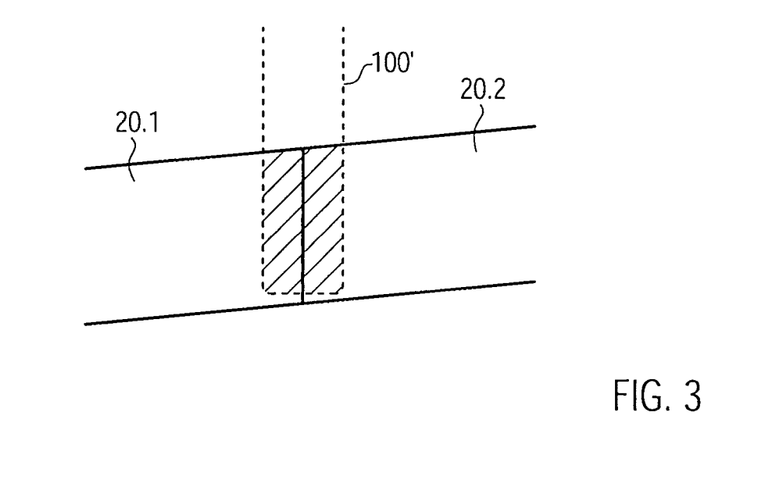
FIG. 3 illustrates a view of an example deep-penetration welding process.

A view of an example welding process corresponding to the deep-penetration welding method is illustrated in FIG. 3. A modified laser beam 100' with an annular intensity distribution is directed onto the area between two butt-aligned workpieces 20.1 and 20.2. The modified laser beam 100' with its ring focus covers this joint area symmetrically on both sides. A cross-section of the modified laser beam 100' acting in the weld seam area is represented. The geometrical expanse of a melting bath produced with the laser beam 100' by melting the rim area of the workpiece 20.1 and the rim area of the workpiece 20.2 is shown by a dotted line. The thus-produced keyhole has the same diameter in the upper and largely in the lower area. In contrast to conventional deep-penetration welding processes, the diameter of the keyhole does not decrease with the penetration depth. In particular, the width of the ring focus is maintained into the lower area of the keyhole. The rim area of the keyhole then is melted by the formed ring focus. As a result, the melted area is also established into the depth in a corresponding width, which increases the quality of the weld seam. In addition, the dynamic in the melting bath is reduced by the uniformly distributed melt in the melted area, which can improve the quality of the weld seam. Due to the lower dynamic, fewer grooves form on the melt surface during solidification. Accordingly, by using a laser beam with ring focus during deep-penetration welding, it is possible to form a deep optimized weld seam.

Figure 4:
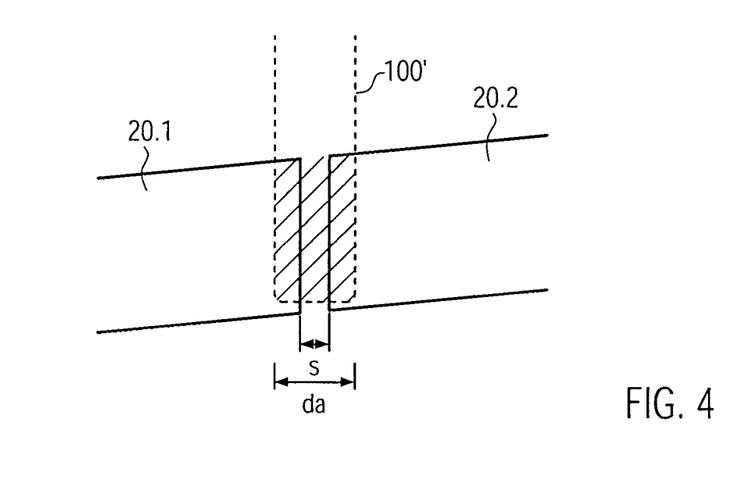
FIG. 4 illustrates a view of an example deep-welding process.

A view of an example welding process for the deep-penetration welding method with gaps is illustrated in FIG. 4 in a similar way to FIG. 3. A gap having a width S is formed between the workpieces 20.1 and 20.2. The modified laser beam 100' having the annular intensity distribution has an external diameter da which is wider than the gap S. During the welding process, the ring focus acts on the rim area of the workpieces 20.1 and 20.2 to melt the rim area. A melting bath is formed which is represented as a dashed line. As a result, in the case of weld seams with gaps between the workpiece 20.1 and 20.2, the melting bath flows together over the gap without breakouts occurring. The coupling efficiency is nevertheless very high when using an annular modified laser beam 100', given that the rim areas, which are melted by the ring focus, flow together in the melting bath. In this way, it is possible to weld structures with gaps by deep-penetration welding. A slight misalignment of the transformed laser beam 100', such as a slight displacement of the modified laser beam 100' to the left or right, onto the joint gap between the workpieces 20.1 and 20.2 also does no harm, given that a rim area of the neighboring workpiece 20.1 or 20.2 is still covered over wide parts by the ring focus through the width da. In contrast, with a conventionally focused laser beam, such a misalignment would quickly result in only one workpiece being melted and a weld seam thus no longer being able to be formed.

Figure 5:
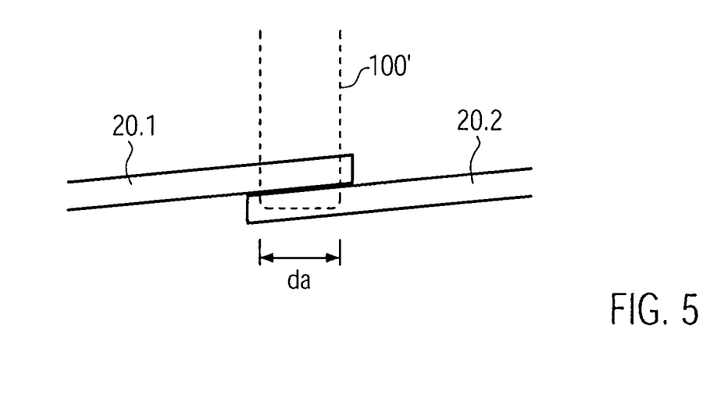
FIG. 5 illustrates a view of an example lap welding process.

A view of an example weld area for the lap welding method is illustrated in FIG. 5. The modified laser beam 100' is directed onto two overlapping workpieces 20.1 and 20.2. As the laser beam has a relatively large width da, the energy input can be introduced into the material of the workpieces 20.1 and 20.2 over a wide surface or wide seam. In this way, it is possible that the dynamic in the melted area can be reduced and the upper bead of a formed weld seam is improved compared with conventional methods. It is also possible by introducing the energy over a wider surface breakouts which would occur with focused Gaussian beams can be avoided.

A number of embodiments have been described. Nevertheless, it will be understood that various modifications may be made without departing from the spirit and scope of the invention. Accordingly, other embodiments are within the scope of the following claims.

What is claimed is:

1. A device for laser processing, the device comprising:
a laser comprising a resonator, the resonator being configured to generate a laser beam with a predetermined caustic during operation of the device; and
an optical element to transform a laser beam generated by the resonator into a transformed laser beam having an annular intensity distribution in a plane perpendicular to a propagation direction of the transformed laser beam during operation of the device, wherein the optical element has a vortex structure configured to cause the transformed laser beam to have an azimuthal phase pitch such that the transformed laser beam has the annular intensity distribution,
wherein the annular intensity distribution extends along the propagation direction of the transformed laser beam, and has, at a minimum diameter of a caustic of the transformed laser beam, a ring width, the ring width being defined as a difference between an inner ring radius and an outer ring radius, wherein the inner ring radius and the outer ring radius correspond to positions along a radial direction of the transformed laser beam at which a beam intensity is 50% of a maximum beam intensity, and wherein a ratio of the ring width to a beam radius of the transformed laser beam at the minimum diameter of the caustic is less than 0.6, the beam radius being determined based on the second moment of the annular intensity distribution.

2. The device for laser processing according to claim 1, wherein the beam radius is determined to be a distance in the radial direction from a center of the annular intensity distribution to a location corresponding to the maximum beam intensity.

3. The device for laser processing according to claim 1, wherein the ratio of the ring width to the beam radius of the transformed laser beam is less than 0.6 along a length of the transformed laser beam extending in front of and behind the minimum diameter of the caustic of the transformed laser beam, the length being equal to at least 5 times a Rayleigh length of the transformed laser beam, and a deviation of the ratio of the ring width to the beam radius is less than 10%.

4. The device for laser processing according to claim 1, wherein the minimum diameter of the caustic of the transformed laser beam corresponds to a focus produced by a focusing lens system.

5. The device for laser processing according to claim 1, wherein the optical element has a quotient-adjustment device to adjust the ratio of the ring width to the beam radius.

6. The device for laser processing according to claim 1, wherein the optical element is arranged outside the resonator.

7. The device for laser processing according to claim 1, wherein the beam radius of the annular intensity distribution is adjustable.

8. The device for laser processing according to claim 1, wherein the optical element comprises a reflective lens system and the reflective lens system is configured to correct imaging errors.

9. The device for laser processing according to claim 8, wherein the reflective lens system adapts the azimuthal phase pitch to a non-linear phase pitch for image field correction.

10. The device for laser processing according to claim 1, wherein the optical element comprises a metal mirror.

11. The device of laser processing according to claim 1, wherein the azimuthal phase pitch is defined by a plurality of azimuthally rising phase pitches.

12. A method for processing a workpiece with a laser beam, the method comprising:

producing a laser beam with an annular intensity distribution extending along a caustic of the laser beam, wherein the annular intensity distribution, at a minimum diameter of the caustic of the laser beam and in a plane perpendicular to the propagation direction of the laser beam, has a ring width, the ring width being defined as a difference between an inner ring radius and an outer ring radius, wherein the inner ring radius and the outer ring radius correspond to positions along a radial direction at which a beam intensity is 50% of a maximum beam intensity; and adjusting, using an optical element having a vortex structure, a ratio of the ring width to a beam radius of the laser beam at the minimum diameter of the caustic to be less than 0.6, the beam radius being determined based on the second moment of the annular intensity distribution, wherein the vortex structure is configured to cause the laser beam to have an azimuthal phase pitch such that the laser beam has the annular intensity distribution.

13. The method according to claim 12, wherein the beam radius is determined to be a distance in the radial direction from a center of the annular intensity distribution to a location corresponding to the maximum beam intensity.

14. The method according to claim 12, wherein the ratio of the ring width to the beam radius is less than 0.6 over a length of the laser beam in front of and behind the minimum diameter of the caustic, the length being equal to at least 5 times a Rayleigh length of the laser beam, and a deviation of the ratio of the ring width to the beam radius is less than 10%.

15. The method according to claim 12, further comprising performing at least one action from the group comprising welding the workpiece with the laser beam, cutting the workpiece with the laser beam, melting the workpiece with the laser beam, heating the workpiece with the laser beam, eroding the workpiece with the laser beam, marking the workpiece with the laser beam, and thermal joining the workpiece with the laser beam.

16. The method according to claim 15, wherein the workpiece comprises a coated surface made of a material with a high evaporation rate.

17. The method according to claim 15, wherein the workpiece comprises aluminum or an aluminum alloy.

18. The method according to claim 15, further comprising using at least one of argon, $N_2$ and $CO_2$ as a protective gas during the processing of the workpiece.

19. The method according to claim 12, further comprising welding together a first workpiece and a second workpiece with the laser beam in a deep-penetration welding process.

20. The method according to claim 12, wherein producing the laser beam with the annular intensity distribution comprises:

receiving, at the optical element, an incident laser beam output from a laser resonator; and transforming, using the optical element, the incident laser beam into the laser beam with an annular intensity distribution.

21. The method according to claim 12, further comprising adapting, using a reflective lens system in the optical element, the azimuthal phase pitch to a non-linear phase pitch for image field correction.

22. The method according to claim 12, wherein the azimuthal phase pitch is defined by a plurality of azimuthally rising phase pitches.

* * * * *

UNITED STATES PATENT AND TRADEMARK OFFICE
CERTIFICATE OF CORRECTION

PATENT NO. : 8,946,586 B2
APPLICATION NO. : 12/730999
DATED : February 3, 2015
INVENTOR(S) : Martin Bea, Joachim Schulz and Hartmut Zefferer It is certified that error appears in the above-identified patent and that said Letters Patent is hereby corrected as shown below:

In the Claims

In Claim 22, column 17, line 49, delete "of" and insert --for--.

Signed and Sealed this
Twenty-third Day of June, 2015

Michelle K. Lee
*Director of the United States Patent and Trademark Office*